United States Patent [19]
McLane

[11] Patent Number: 5,666,410
[45] Date of Patent: Sep. 9, 1997

[54] AUTOMATIC STERILIZER FOR TELEPHONES AND THE METHOD OF USE THEREFORE

[76] Inventor: Jerry McLane, 600 Donna Dr., Anchorage, Ak. 99504

[21] Appl. No.: 567,414

[22] Filed: Dec. 5, 1995

[51] Int. Cl.$^6$ .................................................. H04M 1/00
[52] U.S. Cl. .......................................... 379/452; 379/439
[58] Field of Search ................................ 379/451, 452, 379/437, 439, 447

[56] References Cited

U.S. PATENT DOCUMENTS 4,613,928  9/1986  Weinert ............................. 379/452

*Primary Examiner*—Jack K. Chiang
*Attorney, Agent, or Firm*—Michael J. Tavella

[57] ABSTRACT

A telephone sterilizer device. The device is used in telephones having a base unit and a handset. The handset is a typical telephone handset that is modified by adding two magnetic switch elements. One element is located near the mouthpiece and the second element is located near the center of the handle. Two corresponding switch elements are located in the base unit so that once the handset is returned to the base set completely, the magnetic switch elements close. Once closed, the sterilizer, a UV bulb, energizes. A thermister monitors the temperature of the mouthpiece and disengages the UV light when a sufficient temperature is reached to ensure sterilization is complete. A safety sensor monitors the temperature to ensure that the mouthpiece does not become too hot, thereby possibly causing a user to be burned.

14 Claims, 3 Drawing Sheets

AUTOMATIC STERILIZER FOR TELEPHONES AND THE METHOD OF USE THEREFORE

This invention relates to automatic sterilizers for telephones and particularly to automatic sterilizers for telephones using temperature sensing for control.

BACKGROUND OF THE INVENTION

The telephone is in common use by people every day. The mouthpiece of the telephone handset frequently comes into contact with a user's mouth during use, resulting in the spread of infectious bacteria and viruses. Because these bacteria and viruses may remain on the mouthpiece for some time, diseases can be spread quickly to many people. To reduce the possibility of spreading these diseases, telephone sterilizers have been developed. These telephones use ultraviolet (UV) light as the sterilizing medium. Examples of these devices are found in U.S. Pat. Nos. 2,952,749, to Cobb et al.; 3,040,138, to Cobb; 4,486,628, to Thompson; and 5,008,933, to Kao et al. U.S. Pat. No. 2,952,749, disclosed a basic phone sterilizer system. A UV bulb is shown placed in the base unit of a phone. The system is operated by a simple switch connected to the cradle buttons on the phone. A timer can also be used to control the operation of the UV bulb. There is apparently no safety switch installed and anyone depressing the cradle buttons causes the light to energize. The 3,040,138 patent discloses placing the UV bulb in a carrier attached to the phone base. The removable cover gives ready access to the UV bulb for maintenance. This design uses a micro switch plus a thermal relay to operate the device. Again, apparently no safety devices are employed in this design. U.S. Pat. No. 4,486,628 uses a different system to sterilize the mouthpiece. Here, a radiation producing element is installed within the mouthpiece. This element produces electromagnetic radiation that is sufficient to sterilize telephone components. This radiation may be UV, but is not required to be UV. Unlike the previous designs, the radiation generator is located in the mouthpiece, not in the base unit. The system operates using a standard switch mounted in the cradle that operates when file receiver is placed in the cradle. Finally, U.S. Pat. No. 5,008,933 teaches using an IC timing control circuit to turn off the UV light source. This design also includes a safety switch, mounted independently from the cradle switch, to operate the UV bulb. Here, the user can operate the cradle switch to disconnect the line without causing the UV source to become energized.

Several problems are noted with file above described devices. Most of these devices have mechanical switches to activate the UV light. These switches can be activated while the receiver is off hook, thereby exposing the user to the UV light. Even the Kao et al. patent, that features a safety switch can cause problems because the one safety switch is located adjacent to the cradle switch. Such proximity can result in causing the UV bulb to become energized. Because exposing the eyes to direct UV light can be harmful, such systems are dangerous. Small children are especially curious and may inadvertently or even deliberately cause the UV light to come on, creating a hazardous situation.

Moreover, some of the above systems do not create a leak-proof fit between the mouthpiece and the cradle, thereby allowing UV light rays to escape from the phone. Finally, the designs of some of the above mentioned systems do not fully sterilize the telephone mouthpiece, thereby reducing the effectiveness of the system and increasing the possibility of the spread of disease.

SUMMARY OF THE INVENTION

The instant invention is a telephone sterilizer device with features that overcome the problems discussed above. The instant invention has a base unit that contains the sterilizer equipment. The handset is a typical telephone handset that is modified by adding two magnetic switch elements in the handset. One element is located near the mouthpiece and the second element is located near the center of the handle. Two corresponding switch elements are located in the base unit so that once the handset is returned to the base set completely, the magnetic switch elements close. Once closed, the sterilizer, a UV bulb, energizes. A thermister monitors the temperature of the mouthpiece and disengages the UV light when a sufficient temperature is reached to ensure sterilization is complete. A safety sensor monitors the temperature to ensure that the mouthpiece does not become too hot, thereby possibly causing a user to be burned. A unique feature of this device is that the temperature sensor adjusts the treatment time based on ambient temperature. Thus, the unit ensures adequate sterilization time regardless of the outside temperature. The system for the automatic sterilizer is controlled by the magnetic safety switches that eliminate the mechanical switches found on other systems; a thermostatic switch that controls the system based on the UV bulb temperature, rather than a timer; and an integrated circuit (IC) that operates the system. The UV light is delivered to the mouthpiece through a transparent protective shield. The shield is wire-reinforced plastic that is transparent to UV. The shield is designed not only to allow the UV light to pass through, but also to protect the UV light from dirt, dust and vandals.

The system operates as follows: when the phone is not in use, the control circuit is designed to provide a filament heating current to the UV bulb to keep the filament hot, but below the level that UV light is produced. Picking the telephone up for use sets the control circuit for the next sterilization cycle. After the telephone is used and the received is placed in the cradle, the magnetic sensor switches are closed, causing the control circuit to fully energize the UV bulb. The UV light then sterilizes the mouthpiece. After some time, the UV bulb produces heat and the temperature increases. Once the pre-set temperature increase level ($\Delta T$) is reached, the temperature sensor causes the control circuit to drop back into the filament warming mode, thereby stopping the production of UV rays. The control circuit can then reset for the next operation. A second temperature sensor (a thermister) is used to monitor the mouthpiece temperature. The thermister prevents further operation of the UV bulb if the mouthpiece is too hot.

It is an object of this invention to produce an automatic telephone sterilizing device that does not use mechanical switching to operate the sterilizing circuits.

It is another object of this invention to produce an automatic telephone sterilizing device that does not use timers to control the production of UV light.

It is yet a further object of this invention to produce an automatic telephone sterilizing device that has an integral light-blocking mouthpiece-cradle design to prevent spurious emissions of UV light from the telephone during sterilization.

It is yet another object of this invention to produce an automatic telephone sterilizing device that provides an automatic sterilizer system that is, safe, reliable, easy to maintain, and cost effective to build and operate.

DETAILED DESCRIPTION OF THE INVENTION

Figure 1:
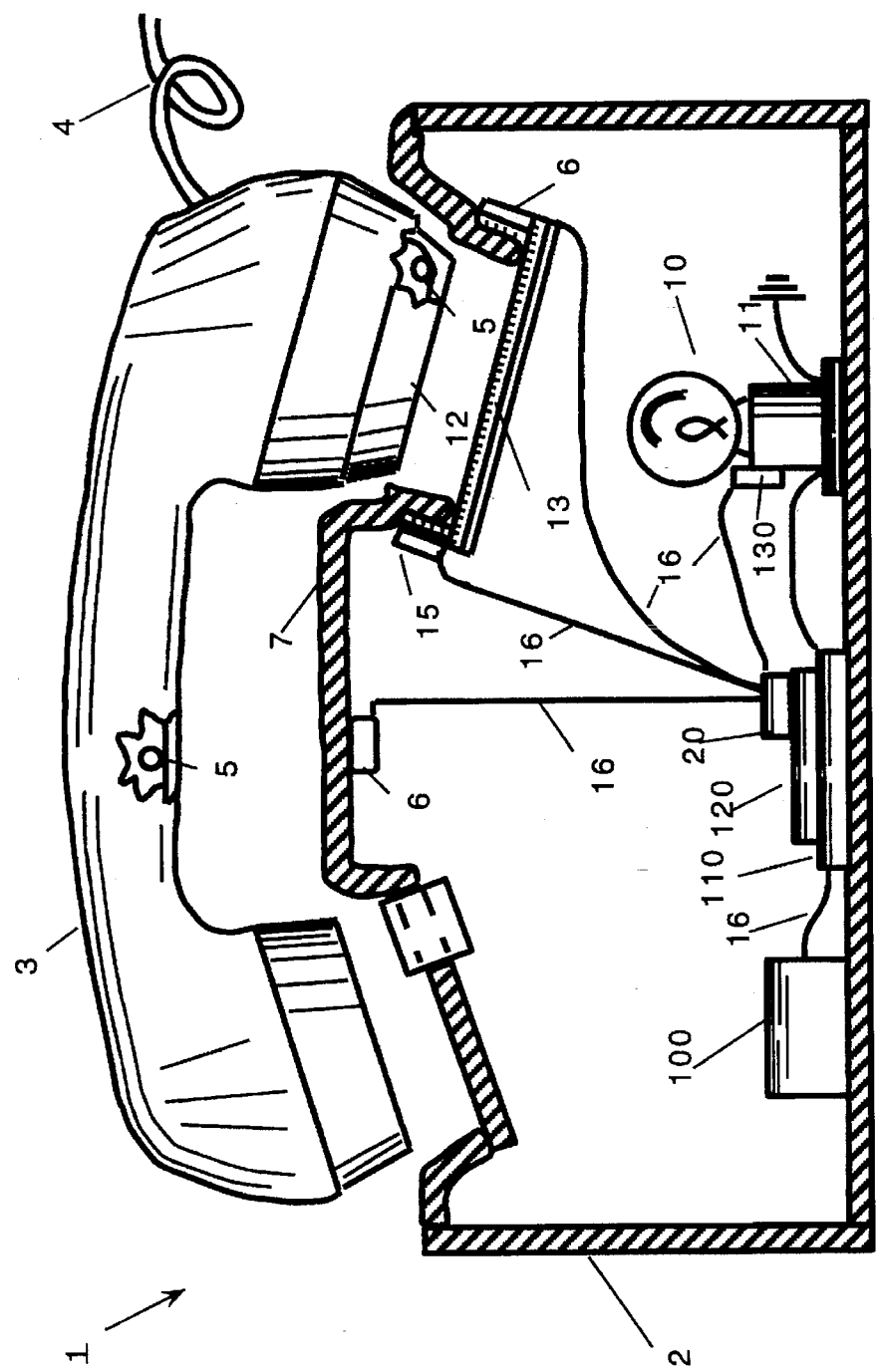
FIG. 1 is a cross-sectional view of the invention.

Referring now to FIG. 1, the telephone sterilizer system 1 is shown. The telephone sterilizer system 1, has a base unit 2 that holds the standard telephone equipment (not shown) as well as the sterilizing equipment. The preferred source of sterilizing radiation is an ultraviolet (UV) light bulb 10. The telephone sterilizer system 1 also has a handset 3 that is attached to the base unit 2 with a standard cord 4. Within the handset 3 are two magnets 5. These magnets operate the magnetic switch elements 6 placed in the base unit 2. The placement of the magnets 5 and switches 6 must correspond so that the magnets 5 and the switches 6 are in substantial alignment when the handset 3 is placed in a normal position within the cradle 7. The position of the magnets 5 and switches 6 as shown is the preferred placement because the UV light 10 cannot be energized unless both magnetic switches 6 are closed. This placement makes it virtually impossible to cause the UV 10 light to be energized with the handset 3 off hook unless the system is tampered with. The UV bulb 10 is shown in a socket 11. The UV bulb 10 is placed under the mouthpiece 12 of the handset 3.

Figure 2:
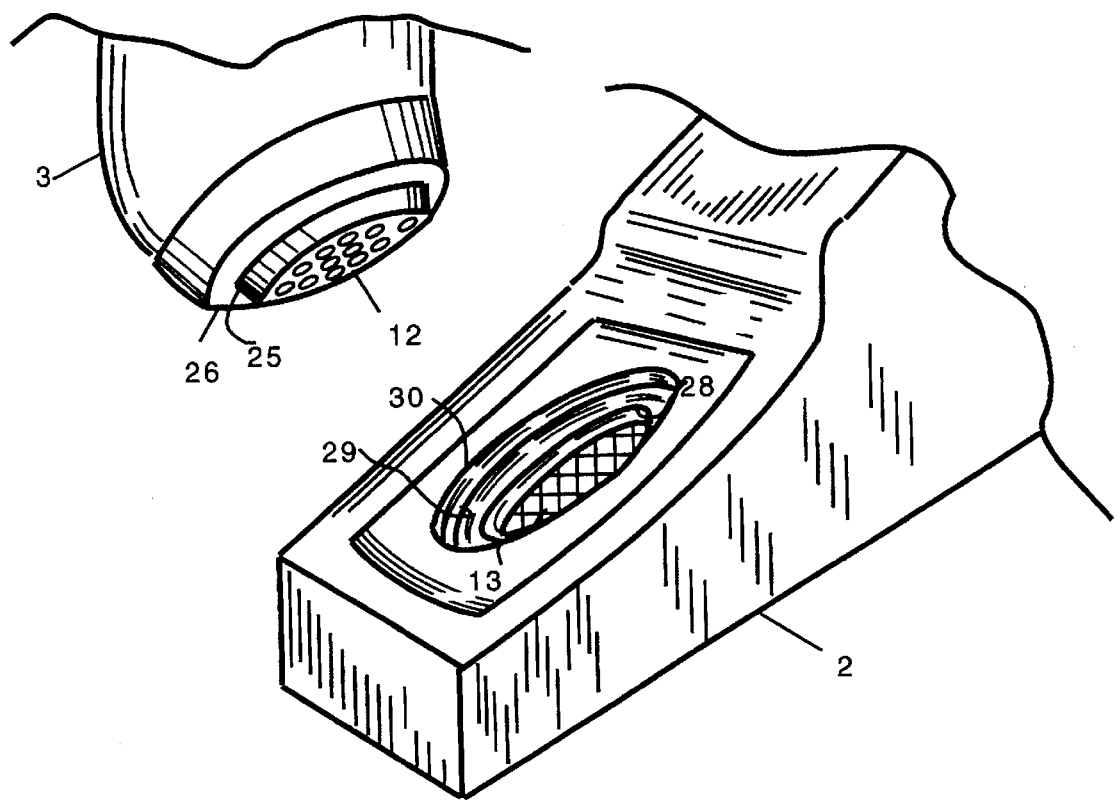
FIG. 2 is a detail view of the phone receiver and cradle.
Figure 3:
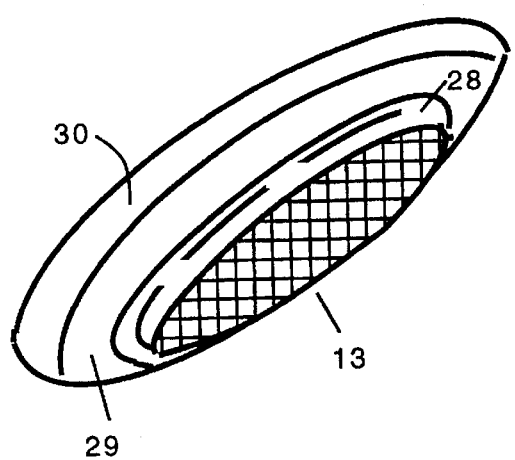
FIG. 3 is a detail view of the bulb shield in the cradle.

A clear, wire-reinforced shield 13 is placed in the cradle 7 for the mouthpiece 12 as shown (see also, FIGS. 2 and 3). The shield 13 protects the UV light 10 and the interior of the base unit 2 from dirt, dust and vandals. A high temperature limit switch digital thermometer 15 (thermister and control circuit) is provided to monitor the temperature of the mouthpiece 12 area to ensure that the mouthpiece 12 does not become too hot. If the mouthpiece 12 temperature does reach too high a level the thermister 15 causes the main power circuit to open, removing power from the bulb and prevents further operation of the sterilizer until the mouthpiece 12 is sufficiently cool.

Figure 4:
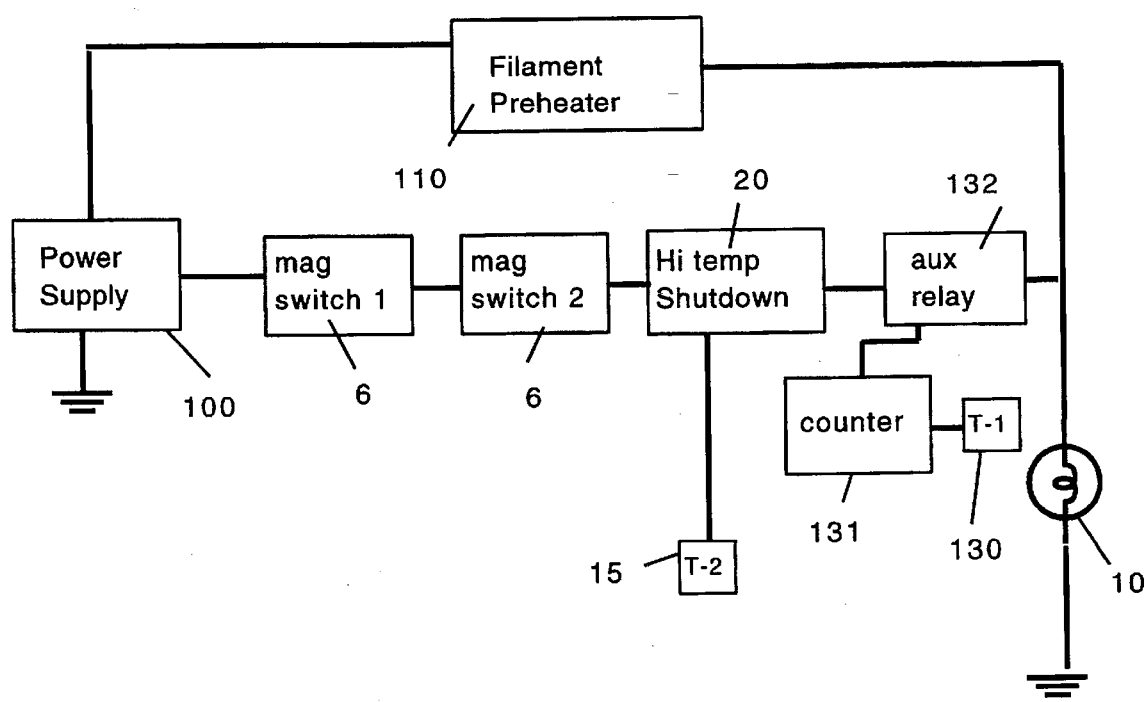
FIG. 4 is an electrical block diagram of the controls for the invention.

All the electrical components described above are connected by wires 16 to various control circuit elements 20. FIG. 4 is a block diagram of the controls for this device.

Referring now to FIGS. 2 and 3, details of the leak-proof cradle design are shown. The handset mouthpiece 12 has an inner annular portion 25. This inner annular portion 25 expands to a flange portion 26. In the base unit 2, the protective wire-reinforced shield 13 has a corresponding shape. The inner portion 28 of the wire-reinforced shield 13 has a recessed portion that accommodates the inner annular portion 25 of the mouthpiece 12. Surrounding the inner portion 28 of the wire-reinforced shield 13 is a flange portion 29. The flange portion 29 has a side wall 30 extending upwardly from the flange 29 for receiving the mouthpiece 12. FIG. 3 is an enlarged detail view that shows the arrangement of the flanges more clearly. This combination of shapes causes the mouthpiece 12 to fit tightly in the cradle 7. The recessed portions and the flanges work to seal the cradle 7 to prevent and UV light from being emitted from the mouthpiece cradle area.

A block diagram of the control circuit is shown in FIG. 4. The diagram shows a main power source 100. This source feeds power to the UV bulb for operation. The power supply 100 may be any suitable source at any appropriate voltage including 110 volts AC or 12 volts DC. The power supply 100 can be a transformer unit installed within the phone or may be external as desired. Any other desired voltages may be used with necessary modification that are well known in the art.

A "soft start" filament pre-heater circuit 110 is shown. This circuit 110 provides just enough energy to the bulb to warm the filament, which extends bulb life. The main control circuit has the two magnetic switches 6 in series with the power source 100. In this way, both switches 6 must be closed to operate the device. The high temperature limit switch 15 is also in series with the switches. If the mouthpiece 12 temperature exceeds the limit, this control circuit prevents further bulb operation. A temperature increase monitor circuit 120 is also wired in series with the other components. This circuit 120 has a temperature sensor 130, a counter circuit 131 and a relay 132. The counter measures the difference in bulb temperature (ΔT) during operation of the bulb. This circuit 130 ensures that adequate sterilization occurs because, unlike timers, the rise in temperature can be set for different climatic regions. Thus, for cold weather, a higher ΔT might be needed to fully sterilize the mouthpiece 12. In this way, the circuit can be set to allow proper sterilization without having to run the UV bulb longer than necessary. Note that any of the temperature related switches discussed above may be electronic switches.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A sterilizer for a telephone comprising:
    a) a base unit having a cradle;
    b) a handset, removably attached to said base unit, said handset also including a mouthpiece, fixedly attached thereto;
    c) a means for producing a sterilizing radiation, fixedly attached within said base unit, such that said sterilizing radiation is focused upon said mouthpiece of said handset when said handset is placed in the cradle of said base unit;
    d) a pair of magnetic switching elements, each element having a magnetic activator and a switch, said pair of magnetic switching elements being fixedly installed in said telephone such that the magnetic activators are installed in said handset at some distance apart and the switches are placed in said cradle in such a position that when the handset is placed in the cradle, the magnetic activators align with and activate the switches;
    e) a temperature sensing means for monitoring a rise in temperature of the means for producing sterilizing radiation, fixedly installed in said base unit;
    f) a power supply means for providing operating energy to said means for producing sterilizing radiation; and
    g) a means for controlling said means for producing sterilizing radiation, whereby said means for controlling monitors the temperature sensing means and controls said power supply means according to a predetermined temperature limit to achieve proper sterilization of the mouthpiece.

2. The sterilizer of claim 1 further comprising: a second temperature sensing means for monitoring the mouthpiece temperature, fixedly installed in said base unit and being electrically connected to said means for controlling said means for producing sterilizing radiation so that when said second temperature sensing means reaches a predetermined temperature limit, said means for controlling shuts down the means for producing sterilizing radiation to prevent the mouthpiece from being overheated.

3. The sterilizer of claim 1 wherein the means for producing sterilizing radiation comprises a bulb that produces ultra violet light.

4. The sterilizer of claim 1 wherein the means for controlling said means for producing sterilizing radiation includes an electronic switch connected in series with said power supply means.

5. The sterilizer of claim 1 further comprising means for preventing inadvertent leakage of radiation from an area of the cradle surrounding the mouthpiece.

6. The sterilizer of claim 3 wherein the means for controlling said means for producing sterilizing radiation includes a filament pre-heater circuit for the bulb that produces ultra violet light.

7. A sterilizer for a telephone comprising:
 a) a base unit having a cradle;
 b) a handset, removably attached to said base unit, said handset also including a mouthpiece, fixedly attached thereto;
 c) a means for producing a sterilizing radiation, fixedly attached within said base unit, such that said sterilizing radiation is focused upon said mouthpiece of said handset when said handset is placed in the cradle of said base unit;
 d) a pair of magnetic switching elements, each element having a magnetic activator and a switch, said pair of magnetic switching elements being fixedly installed in said telephone such that the magnetic activators are installed in said handset at some distance apart and the switches are placed in said cradle in such a position that when the handset is placed in the cradle, the magnetic activators align with and activate the switches;
 e) a first temperature sensing means for monitoring the mouthpiece temperature, fixedly installed in said base unit;
 f) a second temperature sensing means for monitoring a rise in temperature of the means for producing sterilizing radiation, fixedly installed in said base unit;
 g) a power supply means for providing operating energy to said means for producing sterilizing radiation; and
 h) a means for controlling said means for producing sterilizing radiation whereby said means for controlling monitors the first and second temperature sensors and controls said power supply means according to pre-determined temperature limits to achieve proper sterilization of the mouthpiece.

8. The sterilizer of claim 7 wherein the means for producing sterilizing radiation comprises a bulb that produces ultra violet light.

9. The sterilizer of claim 7 wherein the means for controlling said means for producing sterilizing radiation includes an electronic switch connected in series with said power supply means.

10. The sterilizer of claim 7 further comprising means for preventing inadvertent leakage of radiation from an area of the cradle surrounding the mouthpiece.

11. The sterilizer of claim 8 wherein the means for controlling said means for producing sterilizing radiation includes a filament pre-heater circuit for the bulb that produces ultra violet light.

12. The method of sterilizing a telephone having a base unit and a cradle; a handset, removably attached to said base unit, said handset also including a mouthpiece, fixedly attached thereto; a means for producing a sterilizing radiation, fixedly attached within said base unit, such that said sterilizing radiation is focused upon said mouthpiece of said handset when said handset is placed in the cradle of said base unit; a pair of magnetic switching elements, each element having a magnetic activator and a switch, said pair of magnetic switching elements being fixedly installed in said telephone such that the magnetic activators are installed in said handset at some distance apart and the switches are placed in said cradle in such a position that when the handset is placed in the cradle, the magnetic activators align with and activate the switches; a first temperature sensing means for monitoring the mouthpiece temperature, fixedly installed in said base unit; a second temperature sensing means for monitoring a rise in temperature of the means for producing sterilizing radiation, fixedly installed in said base unit; a power supply for providing operating energy to said means for producing sterilizing radiation; and a means for controlling said means for producing sterilizing radiation whereby said means for controlling monitors the first and second temperature sensors and controls said power supply means according to pre-determined temperature limits to achieve proper sterilization of the mouthpiece comprising the steps of:
 a) placing the handset into the cradle, thereby aligning and engaging the magnetic switches, thereby causing the means for controlling said means for producing sterilizing radiation to engage the power supply to activate the means for producing sterilizing radiation;
 b) monitoring the rise in temperature of said means for producing sterilizing radiation; and
 c) disengaging said power supply to deactivate the means for producing sterilizing radiation when a pre-determined rise in temperature has been reached.

13. The method of sterilizing telephones of claim 12 further comprising the steps of monitoring the mouthpiece temperature and disengaging said power supply to deactivate the means for producing sterilizing radiation when a pre-determined mouthpiece temperature has been reached.

14. The method of sterilizing telephones of claim 12 further comprising the step of disengaging the power supply to deactivate the means for producing sterilizing radiation when the handset is removed from the cradle.

* * * * *